Patented July 6, 1943

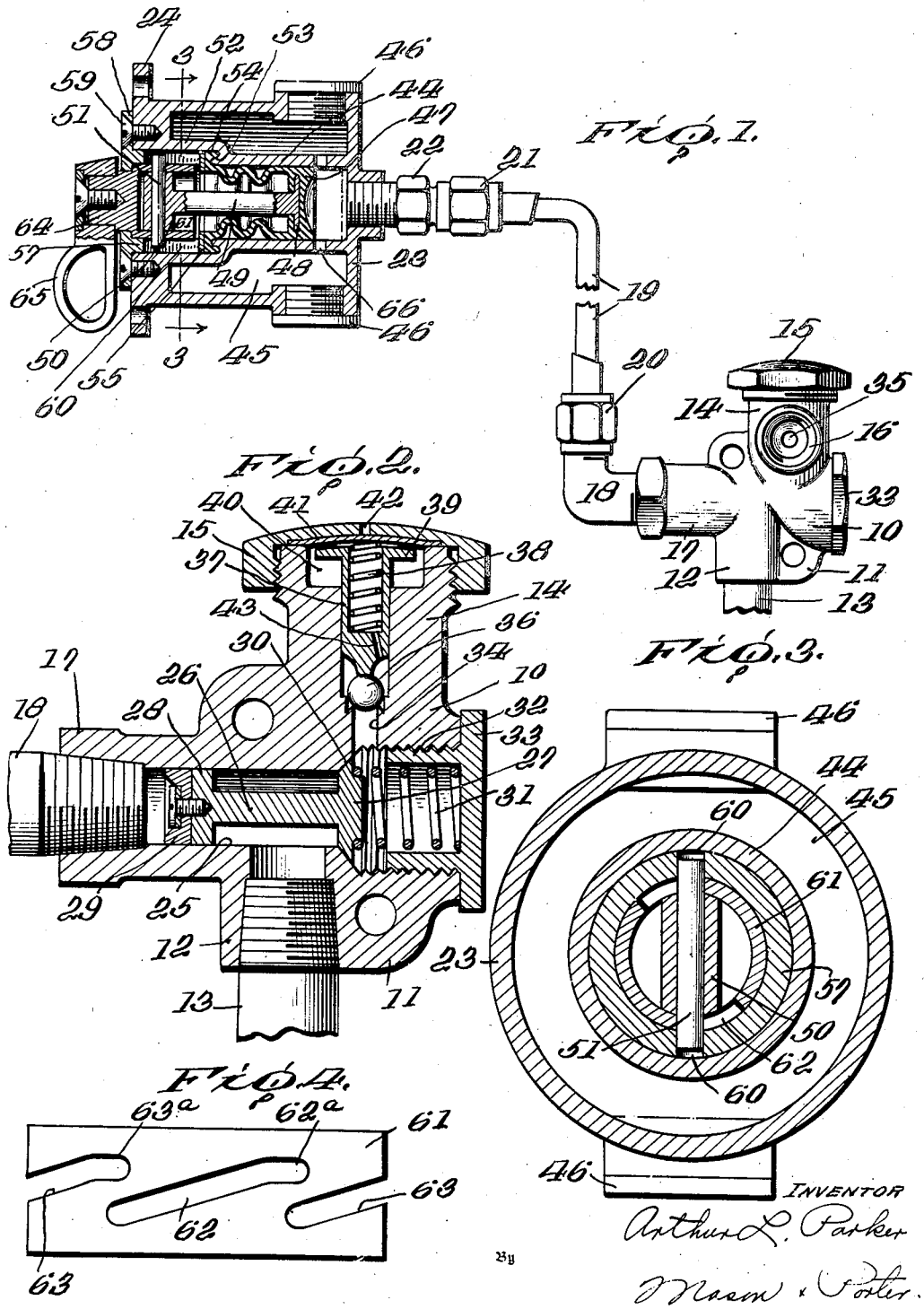

2,323,416

UNITED STATES PATENT OFFICE 2,323,416

PRIMING VALVE ASSEMBLY

Arthur L. Parker, Cleveland, Ohio

Application March 24, 1941, Serial No. 385,022

9 Claims. (Cl. 123—187.5)

The present invention relates to new and useful improvements in a valve controlled priming system, and more particularly to improvements in a hydraulically controlled priming valve assembly which may be conveniently employed for controlling the admission of priming fuel to internal combustion engines.

In various types of internal combustion engines, it is necessary or desirable to prime the engine in order to facilitate starting thereof. The present invention is concerned with the provision of a valve mechanism which is adapted to be used as a priming valve for controlling the passage of priming fuel to the engine. A hand or power pump, or other suitable means may be employed for forcing the priming fuel to the engine. More specifically, the valve assembly of the present invention is adapted for use with aircraft engines where it is desirable to install the priming valve between the supply tank and the engine at a point where a minimum amount of piping need be employed so as to keep the pressure drop in the line down to a minimum. This usually necessitates the mounting of the valve assembly at some point remote from the instrument panel or other location which is easily accessible to the pilot or operator so that the valve must be controlled by some remotely situated mechanism. According to the present invention, the valve mechanism is actuated by a hydraulic pumping device which may be located on the instrument panel and which is adapted to be manually controlled by the pilot or other operator. The pumping device is connected to the valve mechanism in such a manner that actuation of the pumping device will serve to open the valve and permit the passage of priming fuel to the engine priming jets, and spring means may be employed for returning the valve to a closed position after the pumping device is returned to initial position.

An object of the present invention is to provide a fuel priming system including a priming valve assembly which may be situated at a point remote from the operator and hydraulically controlled by means readily accessible to the operator.

Another object of the invention is to provide a fuel priming system of the above type wherein manipulation of hydraulic actuating means which includes a piston acting on a fluid column, serves to open the normally closed priming valve.

A further object of the invention is to provide a fuel priming system of the above type wherein the priming valve assembly includes an auxiliary valve which is responsive to initial starting of the engine for closing the priming line in order to prevent further passage of priming fuel to the engine after starting thereof.

The invention still further aims to provide a fuel priming system of the above type which is constructed and arranged so as to be light in weight and so as to require a minimum amount of space for installation and operation.

The above and other objects of the invention will in part be obvious and will be hereinafter more fully pointed out.

In the accompanying drawing:

Figure 1 is a view showing the assembly of the priming valve mechanism and the hydraulic actuating means, the casing for the valve mechanism being shown in elevation and the hydraulic actuating mechanism being shown in longitudinal section.

Figure 2 is an enlarged longitudinal sectional view through the casing and showing the valve means for controlling the passage of priming fuel.

Figure 3 is an enlarged sectional view taken along the line 3—3 of Figure 1.

Figure 4 is an enlarged view showing the development of the actuating drum for the hydraulic piston.

Referring more in detail to the accompanying drawing, and particularly to Figure 1, the valve assembly is enclosed within a valve casing 10 having apertured portions 11 which permit the valve assembly to be mounted at a suitable location between the source of fuel supply and the engine. The valve casing includes an adapter portion 12, to which the fuel supply line 13 is connected under sufficient pressure to force fuel into the engine manifold. The valve casing also includes an extension 14 which is closed by a cap 15, and which includes an adapter portion 16, which may be connected to the fuel line leading to the engine priming jets. The valve casing is also provided with an adapter portion 17 to which a fitting 18 is connected and this fitting 18 is connected to a fluid conduit 19 by a suitable coupling means 20. The fluid conduit 19 is extended to a point remote from the valve assembly and the opposite end thereof is secured by coupling means 21 to a fitting 22 which is connected to the casing 23 of the hydraulic actuating mechanism for the valve assembly. The casing 23 may be provided with flange portions 24 which permit the hydraulic actuating means to be secured to an instrument panel or other support which is easily accessible to the operator.

The valve mechanism for controlling the passage of priming fuel to the engine priming jets is particularly shown in Figure 2. The casing 10 is provided with a bore 25 within which the reduced stem 26 of the main valve member 27 is reciprocable and this stem is provided with a head portion 28 carrying a suitable form of packing washer 29 for preventing leakage of fluid. The packing washer 29 is in communication with fluid in the conduit 19 and the fitting 18 so that pressure on this fluid will tend to force the valve member away from the fitting 18. The valve member 27 is normally forced into sealing contact with the valve seat 30 by a spring 31 which bears thereon and this spring is housed within the sleeve portion 32 of a plug 33 which engages the valve casing. The bore 25 is in communication with the fuel supply line 13 and when the main valve member 27 is shifted away from the seat 30, fuel may pass into a port 34. This port 34 is adapted to communicate with a port 35 which, in turn, is in communication with the adapter 16 to which the fuel priming line is connected. An auxiliary valve is adapted to control communication between the ports 34, 35 and this valve is illustrated as being in the form of a ball check valve 36 which is adapted to cooperate with a seat around one end of the port 34. A plunger 37 is shiftable within a bore in the casing extension 14 and this plunger is recessed to house a spring 38 which tends to force the plunger and the check valve 36 toward a closed position. The outer end of the plunger 37 is provided with a radial flange portion 39 which is disposed within a recessed part 40 of the extension 14. The recessed part 40 is closed by a diaphragm 41 which is secured between the end of the extension 14 and the cap 15 and one end of the spring 38 bears on the diaphragm. The cap 15 is provided with an aperture 42 so that the adjacent face of the diaphragm 41 is subject to atmospheric pressure. The plunger 37 is provided with an aperture 43 which affords communication between the port 35 and the recess within which the spring 38 is housed.

Referring specifically to Figures 1, 3 and 4, the details of the hydraulic actuating mechanism will now be described. The actuator casing 23 is provided with a central cylindrical portion 44 so that a fluid reservoir 45 is provided between the inner surface of the casing 23 and the outer surface of the cylindrical portion 44. The casing 23 is provided with apertures which may be closed by plugs 46 and in this manner, the fluid medium may be replenished. The chamber within the cylindrical portion 44 is in communication with the fluid conduit 19 through the fitting 22 and a piston or plunger 47 is mounted for reciprocating movement therein. This piston 47 is in the form of a rubber cup-shaped member so that the longitudinal walls thereof may be at least partially collapsed when the piston is in the retracted position shown in Figure 1. The head of the piston is reinforced by a flange 48 which is imbedded therein and this flange is rigid with a piston stem 49. The opposite end of the stem 49 is provided with an enlarged head 50 through which a transverse pin 51 extends. One end 52 of the cylindrical portion 44 is outwardly offset to provide an annular groove and bead portion 53 and the adjacent end 54 of the wall of the piston 47 is directed outwardly to interfit with the bead and groove portion 53. An annular plate 55 bears on the end 54 of the piston and is pressed tightly thereagainst by a sleeve member 57 so as to provide a fluid tight joint. The sleeve member 57 extends outside of the casing 23 and is provided with a lateral flange portion 58 which is secured to the casing by screws 59 or the like. This sleeve member 57 is also provided with diametrically opposed longitudinal slots 60 into which the extended ends of the transverse pin 51 extend.

Within the sleeve member 57, there is provided a cylindrical member or drum 61 which extends around the stem head 50 and is provided with opposed inclined cam slots 62, 63 and the outer ends 62a, 63a of these slots are substantially straight. The transverse pin 51 extends through the opposed slots 62, 63 and into the longitudinal slots 60 in the sleeve member 57. The outer end of the slotted drum 61 is rigid or integral with a hub portion 64 to which a handle member 65 is secured so that rotation of the drum 61 will cause the pin 51, the stem 49 and piston head 47 to move toward the fitting 22, as shown by dotted lines in Figure 1. The slots 62, 63 thus act as camming means to effect longitudinal movement of the piston without rotation of the piston since the ends of the pin 51 are guided for rectilinear movement in the slots 60. The cylindrical portion 44 may be provided with lateral openings 66 which permit the flow of fluid between the chamber within the cylindrical portion and the reservoir 45, so that the conduit for the fluid column between the adjacent head of the valve stem 26 and the piston head 47 will be maintained full of fluid.

In operation, and in order to initially start the engine, the handle 65 is turned so as to rotate the cam drum 61. This rotation of the drum 61 and the inclined slots therethrough will effect inward movement of the piston stem 49 and the piston head 47 through the connection between the ends of the pin 51 and the inclined slots 62, 63. The piston will be caused to move in a rectilinear path without rotation because the slots 60 in the sleeve member 57 prevent the pin 51 from rotating. This inward movement of the piston head 47 will close the openings 66 to the reservoir 45 and will then force the body of fluid through the conduit 19 and exert a pressure on the washer 29 which is carried by the head 28 of the valve stem 26. As a result, the valve member 27 will be shifted away from the seat 30 so as to afford communication between the fuel supply line 13 and the port 34. The pressure of the fuel will shift the check valve 36 away from its seat and permit the fuel to pass through the port 35 and into the fuel priming line which is adapted to be connected to the adapter 16. Thus, priming fuel will be admitted to the engine priming jets.

After the engine has started, the operator may return the handle 65 to its original position and this will return the piston head 47 to the position shown in Figure 1. The spring 31 in the valve casing will then shift the valve member 27 to its seated position closing the priming line. However, if the operator omits to return the handle 65 to its original position, the suction created by the running engine will create vacuum within the recess of the plunger 37 through the aperture 43. This reduced pressure within the recess will result in the diaphragm 41 which is open to the atmosphere through the port 42, being shifted inwardly to further compress the spring 38. This further compression of the spring 38 is such as to effect shifting of the plunger 37 and resultant closing of the port 34 by the check valve 36.

In this way, the port 34 is closed upon initial starting of the engine so as to prevent the admission of further priming fuel in the event that the operator neglects to return the handle 65 to its original position. It is to be clearly understood, however, that this check valve assembly is not essential to the proper operation of the present invention and it may be entirely omitted so as to rely only on manipulation of the main valve 27.

While one form of the invention has been shown for purposes of illustration, it is to be clearly understood the various changes in the details of construction and arrangement of parts may be made without departing from the scope of the invention as set forth in the appended claims.

I claim:

1. In a fuel priming system for internal combustion engines, a valve casing connected in the priming line between the fuel supply and the engine, normally closed valve means disposed within said casing for controlling the passage of priming fuel to the engine, means providing a closed conduit independent of the fuel line and filled with fluid in communication with the valve means in said casing, a housing adapted to be located at a point remote from said casing and having a piston cylinder in communication with the fluid in said conduit, a piston located in said cylinder and operable to force the fluid against said valve means whereby to open the said valve means and permit the passage of priming fuel to the engine, and manually rotatable means disposed exteriorly of said housing for effecting movements of said piston.

2. In a fuel priming system for internal combustion engines, a valve casing connected in the priming line between the fuel supply and the engine, normally closed valve means disposed within said casing for controlling the passage of priming fuel to the engine, means providing a closed conduit independent of the fuel line and filled with fluid in communication with the valve means in said casing, a housing adapted to be located at a point remote from said casing and having a piston cylinder in communication with the fluid in said conduit, a piston located in said cylinder and operable to force the fluid against said valve means whereby to open the said valve means and permit the passage of priming fuel to the engine, a rotatable handle device extending exteriorly of said housing, and cooperating cam means between the housing and the handle device for effecting reciprocation of said piston upon rotation of the handle device.

3. In a fuel priming system for internal combustion engines, a valve casing connected in the priming line between the fuel supply and the engine, normally closed valve means disposed within said casing for controlling the passage of priming fuel to the engine, means providing a closed conduit independent of the fuel line and filled with fluid in communication with the valve means in said casing, a housing adapted to be located at a point remote from said casing and having a piston cylinder in communication with the fluid in said conduit, a piston located in said cylinder and operable to force the fluid against said valve means whereby to open the said valve means and permit the passage of priming fuel to the engine, a drum located within said housing and having cam slots therethrough, and a rotatable handle extending exteriorly of said housing, and having projecting means extending into said cam slots whereby to effect reciprocation of the piston upon rotation of said handle.

4. In a fuel priming system for internal combustion engines, a valve casing, normally closed valve means disposed with said casing for controlling the passage of priming fuel from the fuel supply to the engine, means providing a closed conduit filled with fluid independent of the fuel line and in communication with the valve means in said casing, a housing adapted to be located at a point remote from said casing and having a piston cylinder in communication with the fluid in said conduit, a piston located in said cylinder and operable to force the fluid against said valve means whereby to open the said valve means and permit the passage of priming fuel to the engine, a drum located within said housing and having cam slots therethrough, a rotatable handle extending exteriorly of said housing and having projecting means extending into said cam slots whereby to effect movements of the piston upon rotation of said handle, and means providing a guiding slot cooperating with said projecting means for effecting rectilinear movements of the piston.

5. In a priming system for internal combustion engines, a valve casing, normally closed valve means disposed within said casing for controlling the passage of priming fuel from the fuel supply to the engine, means providing a closed conduit filled with fluid independent of the fuel line and in communication with the valve means in said casing, a housing adapted to be located at a point remote from said casing and having a piston cylinder in communication with the fluid in said conduit, a piston located in said cylinder and having a flexible wall portion sealed to one end of said cylinder whereby to prevent the leakage of fluid, and a handle member having cam means associated therewith for effecting reciprocation of said piston in order to control movements of said valve means.

6. In a fuel priming system for internal combustion engines wherein the priming fuel is under sufficient pressure to be forced into the engine, valve means for controlling the passage of priming fuel to the engine, means for normally maintaining said valve means in a closed position, hydraulic actuating means operable to open said valve means and to maintain the said valve means in an open position whereby to permit the passage of the priming fuel to the engine, and a check valve located between the valve means and the engine and responsive to suction created by initial starting of the engine for preventing further passage of priming fuel irrespective of the position of said valve means.

7. In a fuel priming system for internal combustion engines, a valve casing having an inlet port adapted to be connected to the fuel supply line and an outlet port adapted to be connected to the engine priming line, said valve casing having a cylindrical bore affording communication between the inlet and outlet ports with the inlet port communicating with the bore intermediate with ends thereof, means providing a valve seat at one end of said bore between the inlet and outlet ports, a valve member cooperating with said valve seat for controlling the passage of fuel and including a reduced stem extending centrally into said bore, said stem carrying a piston head adjacent the opposite end of said bore and serving to seal the fuel line, spring means normally closing said valve member, and hydraulic actuating means remotely situated with respect to said valve casing and including a closed body of fluid operating on said piston head and independent of and separate from the fuel line, for shifting said valve member to an open position against the action of said spring means.

8. In a fuel priming system for internal combustion engines, a valve casing having an inlet port adapted to be connected to the fuel supply line and an outlet port adapted to be connected to the engine priming line, said valve casing having a cylindrical bore affording communication between the inlet and outlet ports with the inlet port communicating with the bore intermediate with ends thereof, means providing a valve seat at one end of said port between the inlet and outlet ports, a valve member cooperating with said valve seat for controlling the passage of fuel and including a reduced stem extending centrally into said bore, said stem carrying a piston head adjacent the opposite end of said bore and serving to seal the fuel line, spring means normally closing said valve member, a remotely situated housing, means providing a fluid filled conduit independent of the fuel line and connecting said housing with the end of said bore adjacent the piston head, manually operable means associated with said housing for shifting the body of fluid to effect opening of the valve member against the action of said spring means, and a check valve located between the bore in said casing and the outlet port, and responsive to suction created by starting of the engine for preventing further passage of priming fuel to the engine after it has started.

9. In a fuel priming system for internal combustion engines, a valve casing connected in the priming line between the fuel supply and the engine, normally closed valve means disposed within said casing for controlling the passage of priming fuel therethrough, means providing a closed conduit filled with fluid in communication with the valve means in said casing but separated from and independent of the fuel line, remotely situated actuating means including a piston operating on the fluid in said conduit for shifting said valve means to an open position whereby to permit the passage of priming fuel through the casing to the engine, and a check valve located between the valve means and the engine and responsive to suction created by initial starting of the engine for preventing further passage of priming fuel irrespective of the position of the valve means.

ARTHUR L. PARKER.